May 23, 1950 L. T. ANDERSON ET AL 2,509,050

TIMED TRUNK RELEASE

Filed Oct. 29, 1948 3 Sheets-Sheet 1

INVENTORS L.T. ANDERSON
M.C. GODDARD

BY P. C. Smith

ATTORNEY

TIMED TRUNK RELEASE

INVENTORS L. T. ANDERSON
M. C. GODDARD
BY P. C. Smith
ATTORNEY

INVENTORS L.T. ANDERSON
M.C. GODDARD
BY P. C. Smith
ATTORNEY

Patented May 23, 1950

2,509,050

UNITED STATES PATENT OFFICE 2,509,050

TIMED TRUNK RELEASE

Lynn T. Anderson, East Orange, N. J., and Myron C. Goddard, Garden City, N. Y., assignors to Bell Telephone Laboratories, Incorporated, New York, N. Y., a corporation of New York Application October 29, 1948, Serial No. 57,387

4 Claims. (Cl. 179—18)

This invention relates to telephone systems in which connections between subscribers' lines are established by automatic switching equipment and more particularly to trunk circuits for interconnecting subscribers' lines which terminate within the same office of the exchange area.

Trunk circuits of the type to which the present invention is directed are particularly applicable to a telephone system of the so-called cross bar type disclosed in the application of A. J. Busch Ser. No. 57,394 filed concurrently herewith.

In a system of this type a marker is employed to control the operation of cross bar switches located on a line link frame and on a trunk link frame to select an idle channel extending from a desired subscriber's line to one end of an idle intraoffice trunk circuit which terminates at both of its ends at cross-points of cross bar switches on the trunk link frame. This selected channel is set up in accordance with the digits of the desired line number dialed by the calling subscriber. When such channel is selected and the marker finds the desired line to be idle, the marker then selects an idle channel extending from the calling line to the other end of the intraoffice trunk circuit and operates cross bar switches on the line link frame on which the calling line terminates and on the trunk link frame on which the selected intraoffice trunk circuit terminates in accordance with the selected channel to interconnect the calling and called lines.

The intraoffice trunk circuit in accordance with the present invention provides the necessary equipment for supplying ringing current to the called line as selected by a ringing selection switch and applied to the trunk circuit under the control of the marker; for tripping the ringing upon the response of the called subscriber; for furnishing transmitter battery supply to both the calling and called lines and for providing supervision on the established connection.

It is an object of the present invention to provide an intraoffice trunk circuit of the character above-outlined which shall be simple in structure and reliable in operation.

The novel features of the invention by which this object is attained are set forth in the appended claims and the invention as to its organization and its mode of operation will be best understood from the following detailed description when read in connection with the drawing in which:

Figure 1:
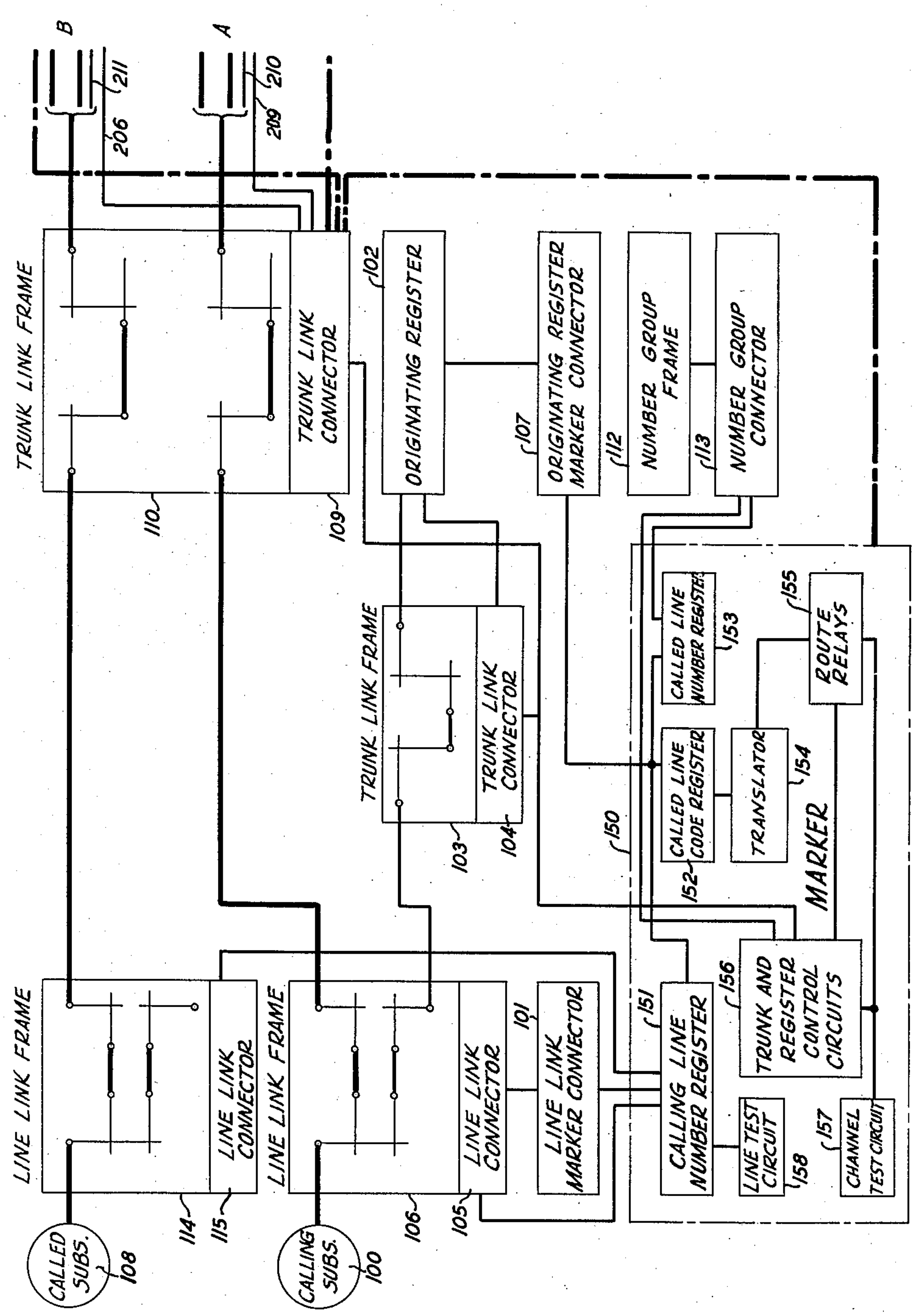
Fig. 1 shows schematically the equipment of an office of the cross bar type by which a calling line and a desired or called line may be connected to the incoming and outgoing ends of an intraoffice trunk circuit.
Figure 2:
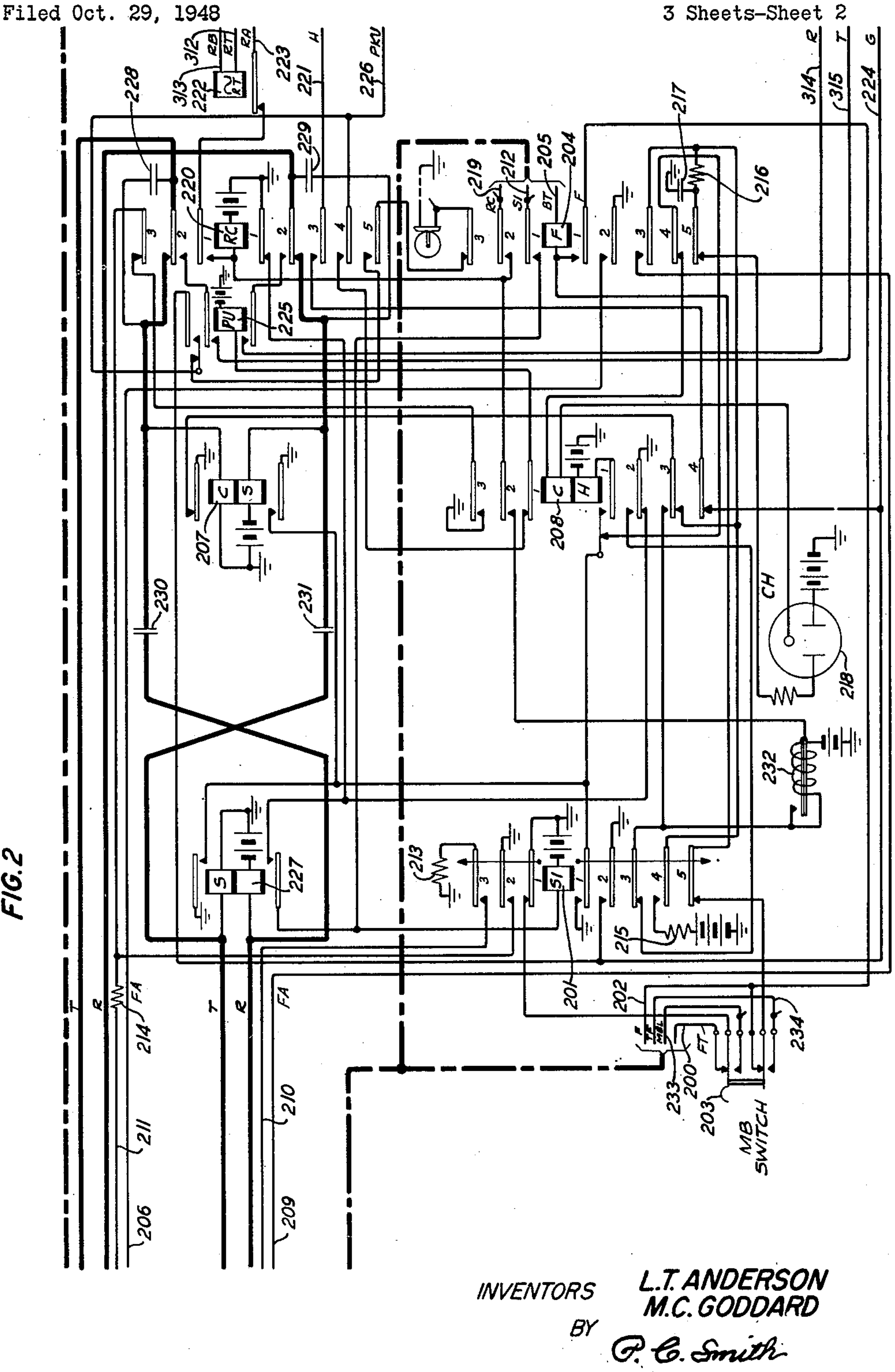
Fig. 2 shows an intraoffice trunk circuit embodying the present invention.
Figure 3:
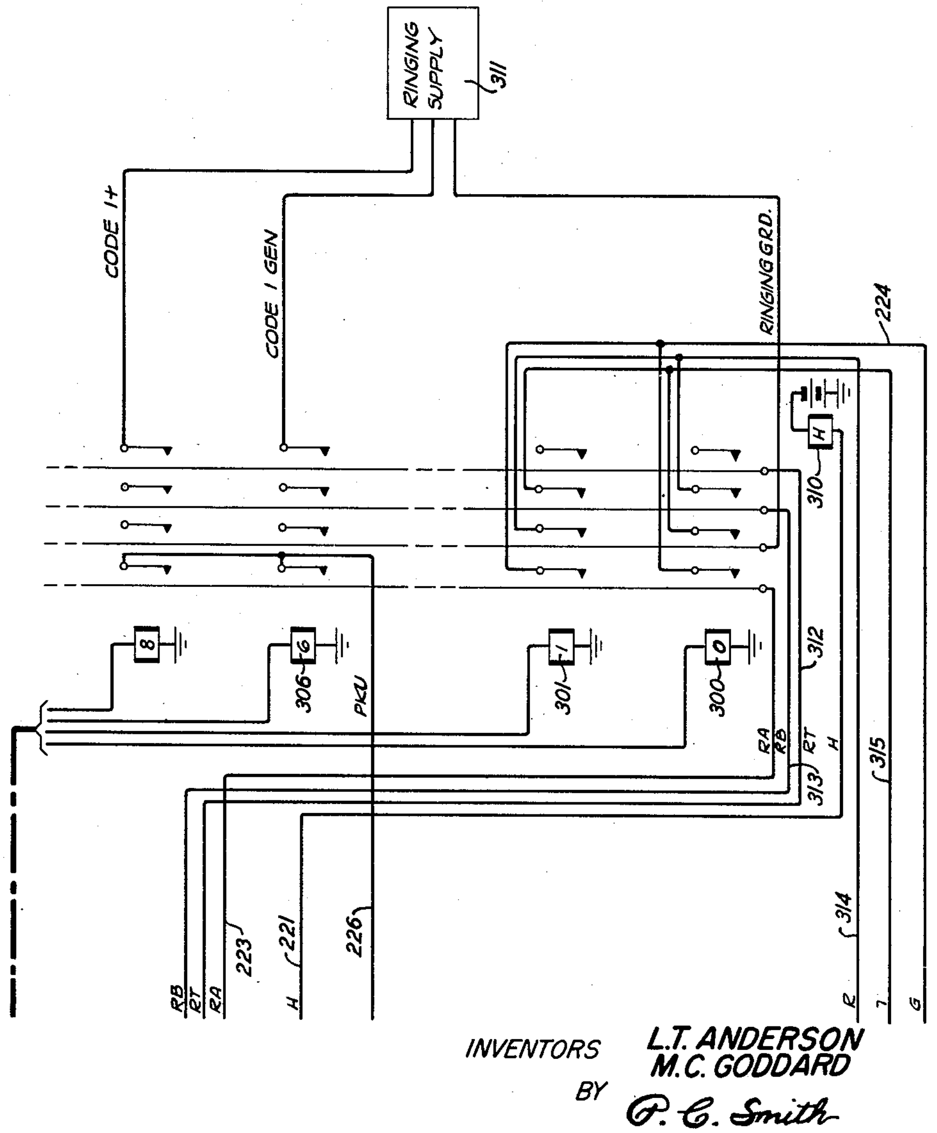
Fig. 3 shows a ringing selection switching circuit selectively operable to select the type of ringing required for any particular connection over the intraoffice trunk circuit and for connecting the selected ringing current source to the trunk circuit.

For a complete disclosure of the invention, Fig. 2 should be placed to the right of Fig. 1 and Fig. 3 should be placed to the right of Fig. 2.

The switches schematically disclosed in the boxes of Fig. 1 labeled Line Link Frame and Trunk Link Frame and the ringing selection switch of Fig. 3 are of the well-known cross bar type such as is disclosed for example in Patent 2,021,329 granted November 19, 1935 to J. N. Reynolds. In the switch of Fig. 3, the select magnets are selectively operable from the marker in accordance with the setting of the number group to determine the type of ringing required for a specific connection and the hold magnets are individualized to ten trunk circuits, one of which is shown in Fig. 2, to which the ringing selection switching circuit of Fig. 3 is common.

The circuits and apparatus schematically disclosed in Fig. 1 of the drawing are fully disclosed and described in the application of A. J. Busch hereinbefore referred to and such portions of said application as are of assistance in the comprehension of the present invention are to be considered as embodied in the disclosure of this application.

The invention will now be considered in detail. It will be assumed that the calling subscriber at the substation designated 100 in Fig. 1, initiates a call whereupon a connection is established from the line link frame 106 on which the calling line terminates to an idle marker 150. Access to the marker is gained through the line link marker connector 101 which connects only such leads as are necessary to identify the line link frame to the marker by its frame number and to inform the marker that a dialing connection is to be established. The marker 150 then proceeds through its trunk and register selection control circuits 156 to select an idle originating register, such as is schematically disclosed by the box 102, which will later serve to transmit a dial tone to the calling line and to receive dial pulses.

Originating registers are distributed over the trunk link frames. By means of test leads extending from the registers to the marker, the marker determines which trunk link frames have idle registers and which frames are not being used by other markers. It then preferentially selects an idle frame with idle registers and connects to the frame through the trunk link connector. The marker then preferentially selects an idle register and connects to it. It will be assumed that the originating register 102 is idle and is accessible from the idle trunk link frame 103, which frame is connected to the marker through the trunk link frame connector 104.

The determination of the location of the calling line is begun as soon as the marker is seized and continues while the marker is selecting an idle register. Line location is made in terms of the line link frame, the vertical group, the horizontal group and the vertical file. A line link vertical group of subscribers' lines is five verticals wide and ten switches high. Following marker seizure, the marker determines which vertical group contains the line awaiting service. The vertical group contains a maximum of fifty subscribers' lines, therefore the determination of the vertical group localizes the subscribers' lines as within fifty of the maximum of 690 lines terminating on the frame.

A line link horizontal group of subscribers' lines is one switch high and the width of the supplied line of switches, the maximum width being that of a frame containing fourteen vertical groups. The marker determines which horizontal group has one or more lines within the selected vertical group awaiting service and the marker then preferentially selects one group. The line to be served has now been located within five lines as determined by the selected vertical and horizontal groups.

Line location does not proceed past the horizontal group selection until the marker has seized the trunk link frame. Following trunk link frame seizure, the marker seizes the line link frame 105 which has identified itself through its marker connector 101 whereby leads are extended to the marker for vertical file identification and for completing connection to the frame. A line link vertical file of subscribers' lines is one vertical wide and ten switches high. Thus one vertical group contains five vertical files. The marker tests the five lines found in the vertical file in which the calling line is located and if more than one line are awaiting service, the marker preferentially selects one. The marker then transmits the line link frame number and the selected line location to the originating register.

After the horizontal group has been determined and an originating register seized, the marker selects one of ten channels which may be used to connect the calling line to the register. The marker tests the junctor, line link and trunk link in each channel to see what junctors or links are already in use on other calls. The lowest numbered available channel is chosen and the marker operates the select and hold magnets on the line link and trunk link frames to establish the channel. It has been assumed that the selected channel extends over the line link frame 106 and the trunk link frame 103. When the channel is selected, the marker indicates to the register the number of the line link used in the channel and the register stores this information for future use.

After the channel has been established and checked, the marker releases leaving in the register the line link frame number, calling line location and the line link number used in the dialing connection to the register 102.

The calling subscriber then receives a dialing tone from the selected originating register 102 after which the subscriber proceeds to dial the digits of the wanted line number, which digit impulses are registered in the originating register. After the entire number has been dialed, the register calls in a marker over the originating register marker connector 107. As soon as a marker has been connected to the register, the register proceeds to transmit to the marker the calling subscriber's line link frame location which is then registered in the calling line number register 151 of the marker, the office code digits of the called line number which are registered in the called office code register 152 of the marker and the numerical digits of the called line number which are registered in the called line number register 153 of the marker. From the called office code register 152, the marker proceeds through the translator circuit 154 to determine the routing of the desired connection thereby resulting in the operation of a route relay in the group of route relays 155. It will be assumed that in the case under consideration the desired subscriber's line 108 terminates in the same office as the calling line 100 and that therefore the selected route relay is effective to control the setting up of a connection between the subscriber's lines over an intraoffice trunk.

To accomplish this, the marker seizes an idle trunk link frame which has idle intraoffice trunks. It will be assumed that the trunk link frame 110 is seized over the trunk link connector 109 and connects to an idle intraoffice trunk, for example the trunk shown in Fig. 2.

While trunk selection is taking place, the marker determines the line link frame location of the called line by consulting the number group. The marker seizes the number group frame 112 over the number group connector 113 and passes the numerical digits of the called number to it from the called line number register 153. The number group translates the numerical digits into the location in terms of line link frame number, vertical group, horizontal group and vertical file. The number group also gives the marker information for setting the ringing selection switch for ringing the called subscriber. The intraoffice trunk circuits appear on a vertical file of the switch and different ringing codes appear on the horizontals. The marker after receiving the required information from the number group and after an idle channel has been selected, operates the selected hold magnet to connect the proper individual or party line ringing into the trunk circuit. The marker then disconnects and leaves the switch held by the trunk circuit.

The marker seizes the line link frame on which the desired line terminates after the called number information has been received from the number group and after the trunk link frame has been seized. It will be assumed that the line link frame 114 is seized through the line link connector 115. The called line 108 is then selected and tested for its idle or busy condition. If the called line is idle, the marker interconnects the called line and the intraoffice trunk circuit by an idle channel. The marker tests to see what junctors are already in use on other calls. The lowest numbered available channel is chosen and the marker operates the select and hold magnets on the line link and trunk link frames 114 and 110 to establish the channel. If the called line is busy, the calling line is connected through a channel to a tone trunk terminating on a trunk link frame in the manner set forth in application Serial No. 57,382 of J. Michal filed October 29, 1948.

After the marker establishes the terminating connection, it seizes the line link frame 106 of the calling subscriber and selects an idle channel between the intraoffice trunk and the calling line. The dialing connection previously established is not released until the marker determines that an idle channel exists between the calling line and intraoffice trunk.

The marker has recorded the number of the line link used in establishing the dialing connection to the originating register 102 and may therefore reuse that line link as part of the originating connection if the link is part of the lowest numbered available channel. The marker then proceeds to operate the select and hold magnets on the line link and trunk link frames 106 and 110 to establish a connection from the calling line 100 to the intraoffice trunk over the selected channel. The calling subscriber's line 100 is now connected over the line link frame 106, the trunk link frame 110, the intraoffice trunk and the line link frame 114 to the called line 108. The marker now becomes disconnected and releases the originating register 102.

It has been assumed that the marker 150 has through the trunk link connector 109 been directed to the trunk link frame 110 on which an idle one of a group of intraoffice trunk circuits terminate. The ends of each trunk circuit, termed the A and B appearances, terminate in the same level of different switches of the trunk link frame.

There is a frame test (FT) lead 200 for each trunk link frame on which intraoffice trunk circuits appear and each idle trunk circuit supplies ground from the upper back contact of the SI relay 201 to such test lead. The marker has access to the test leads, such as 200, through the trunk link connector 109 and knows that there is at least one idle trunk circuit on each frame corresponding to a grounded lead 200. The marker then proceeds to select one of the frames with available trunk circuits and supplies ground on the frame (F) lead 202 to all the intraoffice trunk circuits appearing on that frame. It will be assumed that the trunk circuit shown in Fig. 2 is one of such trunk circuits which appear on the trunk link frame 110. This ground on lead 202 is applied over the lower normal contacts of the make busy (MB) switch 203, over the lower back contact of the SI relay 201 to the right terminal of the winding of the F relay 204 of each trunk circuit that is idle. The marker determines which of the trunk circuits are idle while looking for this ground through the windings of the F relays and over the busy (BT) lead 205 selects one of the idle trunk circuits. These trunk link frame and trunk circuit selections are carried out by the marker in the same general manner as the originating register selection previously referred to.

When a marker selects a trunk circuit, for example, the one disclosed in Fig. 2, it applies battery to the individual lead 205 thereby operating the F relay 204 of such trunk circuit. Relay 204 upon operating locks over its lower No. 1 contacts, over lead 202 to ground at the marker. When the marker selects the trunk link frame 110 on which the trunk circuit of Fig. 2 appears, it locks out all other markers from such frame until the marker 150 has completed setting up the connection.

Relay 204 upon operating connects ground over its lower No. 2 contacts to the FA lead 206 extending to the trunk link connector 109 for determining the cross-point in a horizontal level of a switch on the trunk link frame 110 where the B appearance of the trunk circuit is located and connects ground over the upper back contact of the CS relay 207, over the lower No. 3 back contact of the CH relay 208 and the lower No. 3 contacts of relay 204 to the FA lead 209 extending to the trunk link connector 109 for determining the cross-point in a horizontal level of a switch on the trunk link frame 110 where the A appearance of the trunk circuit is located. This latter ground connection is established over back contacts of relays 207 and 208 to insure that such relays are unoperated and their contacts closed before the marker sets up a connection on the trunk circuit to guard against a timed release as will be discussed later. The connection of ground to the FA leads 206 and 209 causes the operation of FA and FB relays (not shown) in the trunk link connector 109 which in turn cause the operation of a level LV relay (not shown). The operation of the FA and FB relays perform the necessary functions in conjunction with the marker to set up the connection between the calling subscriber's line 100 and the called subscriber's line 108.

One of these functions is the transference of the sleeve leads 210 and 211 to the marker 150 for testing and the tips and rings from the trunk circuit to the marker for continuity checks to the subscribers' lines. In addition the operation of the LV relay of the trunk link connector establishes a circuit from the marker to the SI lead 212 of the trunk circuit, thence over the upper No. 1 contacts of F relay 204 and through the winding of the SI relay 201 to battery and ground so that the marker causes relay 201 to operate.

Relay 201 upon operating makes the trunk circuit busy by opening the F lead 202 at its lower No. 5 back contact, thereby opening the initial operating circuit for the F relay 204 and at its upper No. 1 back contact removes ground from the FT lead 200 so that if all the intraoffice trunk circuits on the trunk link frame 110 become busy, the FT lead 200 will not be grounded and the trunk link frame will test busy to any marker. Relay 201 also connects ground through the 10-ohm resistor 213 over its upper No. 3 contacts to sleeve conductor 210 of the A appearance of the trunk circuit and connects ground over its upper No. 2 contacts and through the 10-ohm resistor 214 to sleeve conductor 211 of the B appearance of the trunk circuit to provide holding grounds for the hold magnets of the connection to the trunk circuit at the trunk link frame after the connection has been set up. Relay 201 also supplies positive 130-volt potential through resistor 215 over its lower No. 4 contacts and through resistor 216 and condenser 217 to ground for controlling the delayed priming of the CH tube 218 but this is not effective until the CS relay 207 operates upon the response of the called subscriber, since the condenser 217 is shunted by ground applied over the upper back contact of relay 207 and the lower back contact of relay 208.

In the meantime, the marker has received information from the number group frame 112 concerning the type of ringing to be supplied and has operated select magnets of the ringing selection cross bar switch, of Fig. 3, allocated to the trunk circuits appearing on the same level of each of the ten trunk switches on the trunk link frame 110. It will be assumed that for ringing the called subscriber 108, the marker completes the circuit through the trunk link connector 109 and through the winding of select magnet 306 to ground to enable the application of negative superimposed ringing for two seconds followed by a four-second silent interval and the marker also establishes a circuit for the select magnet 300 so that the above ringing is applied to the ring conductor and ringing ground to the tip conductor. After the select magnets have been operated, the marker connects ground to the RC lead 219 thereby completing a circuit from ground on such lead, over the upper No. 2 contacts of the F relay 204 and through the winding of the ringing control RC relay 220 to battery and ground.

Relay 220 thereupon operates and establishes a circuit from ground over the lower No. 2 contacts of the SI relay 201, over the lower No. 4 back contact of the CH relay 208, over the lower No. 3 contacts of relay 220 and conductor 221 through the winding of hold magnet 310 of the ringing selection switch which magnet is individual to the intraoffice trunk circuit of Fig. 2. In this connection it is to be noted that the other nine hold magnets of the switch may be allocated to other intraoffice trunk circuits, to revertive ringing trunk circuits or to incoming trunk circuits which have appearances on the same trunk link frame 110. The operation of hold magnet 310 with the select magnet 300 operated as previously described, establishes a locking circuit for the RC relay 220 which may be traced from battery through the winding and upper No. 1 contacts of relay 220, over the back contact of ringing trip (RT) relay 222, over the RA lead 223, over the inner cross-point contacts closed by the operation of hold magnet 310 and select magnet 300 and over the G lead 224 to ground at the lower No. 2 contacts of relay 201.

When the marker has completed its functions for this call, it releases the F relay 204 which upon releasing opens the F and SI leads 202 and 212 to the marker, opens the operating circuit for the RC relay 220, at its lower No. 5 back contact prepares the circuit for firing the CH tube 218 after the called subscriber has answered, connects the pick-up supply over its upper No. 3 back contact, the lower No. 5 contacts of the RC relay 220, the upper normal contacts of pick-up (PU) relay 225 to the pick-up lead 226 extending to the ringing selection switching circuit of Fig. 3 and at its lower No. 2 and No. 3 contacts disconnects ground from the two FA leads 206 and 209 thereby releasing the FA and FB relays (not shown) in the trunk link connector circuit 109. The release of these latter relays causes the calling and called subscribers' lines 100 and 108 to be connected through to the intraoffice trunk circuit.

With the calling line connected to the intraoffice trunk circuit over the A appearance of the trunk circuit at the trunk link frame, the calling supervisory S relay 227 is operated under the control of the calling subscriber's switchhook thereby establishing a new circuit for the SI relay 201 which may be traced from ground over the lower No. 2 back contact of the CH relay 208, over the lower contacts of relay 227 and through the winding of relay 201 to battery to hold relay 201 operated after its initial operating circuit has been opened upon the release of the F relay 204. Relay 201 is slow in releasing and will hold over this interval. It should be noted that had the call been abandoned while the marker was functioning, the S relay 227 would not operate to establish the holding circuit for relay 201 and consequently relay 201 would release following the release of the F relay 204 restoring the trunk circuit to normal.

When the call is for a "one ring" station, as will be assumed, the PU relay 225 is immediately operated without awaiting the closure of the interrupter contacts at the pick-up supply connected over the upper No. 3 back contact of relay 204, relay 225 in this instance being operated over a circuit extending from battery through the winding of pick-up relay 225, over the upper No. 1 back contact of the CH relay 208, over the lower No. 4 contacts of the RC relay 220, the PKU lead 226, the left cross-point contacts closed through the conjoint operation of select magnet 306 and hold magnet 310 and the left cross-point contacts closed through the conjoint operation of select magnet 300 and hold magnet 310, conductor 224 and to ground over the lower No. 2 contacts of relay 201. Relay 225 upon operating locks in a circuit over the upper No. 1 back contact of relay 208, over the lower No. 4 contacts of relay 220, the upper alternate contacts of relay 225 and to ground over the lower No. 2 contacts of relay 201.

Ringing current is now connected to the called line from the ringing current supply 311, over the outer right cross-point contacts closed through the conjoint operation of select magnet 306 and hold magnet 310, over the RT lead 312, through the winding of ring trip (RT) relay 222, over the RB lead 313, over the next-to-outer right contacts of the cross-point contacts closed through the conjoint operation of select magnet 300 and hold magnet 310, over the ring (R) conductor 314, over the lower contacts of pick-up relay 225, over the lower No. 2 front contact of relay 220, over the ring conductor R of the trunk circuit, over the ring of the established connection to the called line, returning over the tip of the established connection, the tip (T) conductor of the B appearance of the trunk circuit, over the upper No. 2 front contact of relay 220, over the upper inner contacts of relay 225, tip (T) lead 315, the next-to-inner contacts of the cross-point contacts closed through the conjoint operation of select magnet 300 and hold magnet 310 and to the ringing ground at the ringing current supply 311. At the same time ringing tone is supplied to the calling line through condensers 228 and 229 and over the connection established over the A appearance of the trunk circuit to the calling subscriber's line 100.

If the call is not for a "one ring" station, the pick-up relay 225 does not receive a direct operating ground over the cross-points of the ringing selection switch as just described but awaits a ground connection over the upper No. 3 back contact of the F relay 204 to insure that machine ringing will not start until the beginning of a ringing code. The selection and application of the proper ringing current to signal any subscriber on a party line of any type terminating in the office may be accomplished as fully set forth in the copending application of M. C. Goddard Serial No. 57,386, filed October 29, 1948.

Should the call be abandoned before the called subscriber answers, the S relay 227 releases in turn releasing the SI relay 201 which releases the connection and restores the trunk circuit and associated ringing selection switch vertical to normal.

When the called subscriber answers, the increased current flow from the ringing or silent period voltage operates the ringing trip (RT) relay 222 thereby causing the release of the RC relay 220. Relay 220 upon releasing opens the circuit over which ringing current was applied to the called line and the circuit over which ringing tone was applied to the calling line and the RT relay 222 releases. With relay 220 released, the upper winding of the CS relay 207 is connected over the upper No. 3 back contact of relay 220 to the tip conductor of the connection established to the called line 108 and the lower winding of relay 207 is connected over the lower No. 2 back contact of relay 220 to the ring conductor of the established connection whereupon relay 207 operates. Relay 220 also at its lower No. 4 contacts opens the locking circuit of the PU relay 225 which releases and at its lower No. 3 contacts opens the circuit of holding magnet 310 of the ringing selection switch thereby releasing the vertical of such switch used in conjunction with the trunk circuit of Fig. 2.

The supervisory relays 227 and 207 have carefully balanced windings and the tip and ring condensers 230 and 231 in the talking circuit of the trunk circuit are closely balanced in capacity to provide a good talking circuit.

The CS relay 207 upon operating removes ground at its upper back contact which keeps condenser 217 discharged. This condenser now charges toward the +130-volt potential applied through resistors 215 and 216. The time constant of this charging path is such that it takes from two to five seconds for the voltage across condenser 217 to reach the value that will cause the CH tube 218 to break down on its control gap. If the CS relay 207 should release before the tube breaks down, the condenser 217 is rapidly discharged through resistor 216. When tube 218 does break down on its control gap, the main gap then conducts and establishes a circuit across such main gap through the upper winding of the CH relay 208, over the lower No. 4 back contact of the F relay 204, over the lower No. 1 normal contacts of relay 208 and to ground over the lower No. 1 contacts of the S1 relay 201, to ground over the upper contacts of the S relay 227 or to ground over the lower contacts of the CS relay 207. Relay 208 upon operating locks through its lower winding and lower No. 1 alternate contacts to ground as traced at contacts of relays 201, 227 and 207. When relay 208 opens its lower No. 1 transfer contacts, it opens the circuit through tube 218 thereby extinguishing the tube to obtain long life from the tube. The CH relay 208 is locked until all three relays 201, 227 and 207 have released at the end of the call and supplies an additional ground over its upper No. 3 contacts, the upper No. 3 back contact of the RC relay 220 and through resistor 214 to sleeve conductor 211 to hold the connection toward the called subscriber's line 108.

At the end of the conversation, if the called subscriber disconnects first, relay 207 releases and with relay 208 operated establishes a circuit from battery through the winding of the heater unit 232, over the lower No. 3 front contact of relay 208 and to ground at the upper back contact of relay 207. After about fifteen seconds the heater unit closes its contacts and establishes a circuit from battery through the winding of the RC relay 220, over the upper No. 2 contacts of relay 208, contacts of heater unit 232, over the lower No. 3 front contact of relay 208 and to ground at the upper back contact of relay 207. Relay 220 thereupon operates and opens one holding circuit for the S1 relay 201 at its lower No. 1 back contact and with the other holding circuit of relay 201 opened at the lower No. 2 back contact of relay 208, relay 201 now releases removing ground from the sleeve conductors 210 and 211 at the ends of the trunk circuit thus releasing both the calling and called lines and restoring the trunk circuit to normal through the release of the S relay 227, followed by the release of relays 208 and 220 and the restoration of the heater unit 232. The reoperation of the RC relay 220 was ineffective at this time to reoperate the PU relay 225 since the circuit of relay 225 was opened at the upper No. 1 back contact of the CH relay 208. Also relay 220 was ineffective to operate the hold magnet 310 of the ringing selection switch since the circuit for such magnet was opened at the lower No. 4 back contact of the CH relay 208. The timed release of the connection if the called subscriber disconnects first as just described, prevents a calling subscriber from holding a called line out of service indefinitely should the calling subscriber fail to disconnect following a disconnection by the called subscriber.

When the calling subscriber disconnects first, the release of the S relay 227 opens at its lower contacts the circuit of the S1 relay 201 and such relay releases and disconnects resistance ground at its upper No. 3 contacts from sleeve conductor 210 of the connection toward the calling line and by closing its upper No. 1 and lower No. 5 contacts indicates that the trunk circuit is again idle. The CH relay 208 is still held operated by the locking ground applied over the lower contacts of the CS relay 207 and consequently ground is connected over the upper No. 3 contacts of relay 208 and the upper No. 3 back contact of the RC relay 220 through resistor 214 to sleeve conductor 211 to hold the trunk circuit connected to the called line.

This reduces the possibility of a false start of an originating register and the unnecessary use of the marker. Under this condition a circuit is established from ground over the lower No. 2 front contact of the CH relay 208, over the lower No. 3 back contact of the S1 relay 201 and through the winding of the heater unit 232 to battery. After a fifteen-second interval the heater unit closes the circuit of the RC relay 220 which now opens the circuit of the CS relay 207 and removes ground from the sleeve conductor 211 to release the connection toward the called line. Relay 207 upon releasing also opens the locking circuit of the CH relay 208 which then releases permitting the heater unit 232 to restore and releasing the RC relay 220. If the called subscriber disconnects before the RC relay 220 operates, the CS relay 207 releases releasing the CH relay 208 which then removes ground from the sleeve conductor 211 releasing the connection toward the called line and restoring the trunk circuit to normal.

If the trunk circuit is reselected by a marker while being held by the called subscriber, the marker causes the operation of the F relay 204 which connects ground to the FA lead 206 in the B appearance toward the called line. This operates the FA relay (not shown) in the trunk link connector 109 which opens the tip ring and sleeve conductors of the appearance thus releasing the CS relay 207 and in turn releasing the CH relay 208. The release of relay 208 removes ground from the sleeve conductor 211 thus freeing the trunk circuit from the called line so that the new call can be completed by the marker without further interference.

The make busy MB switch 203 is used to make the trunk circuit busy at any time. It may be operated without interfering with any call that may be in the trunk circuit because it merely opens the FT and F leads 200 and 202 which are already open if the trunk circuit is in use. When the trunk circuit is made busy and is not in use, the ground normally supplied to the FT lead 200 is applied to the MBL lead 233 to light a lamp common to the trunk circuits on the trunk link frame 110 as an indication that there is a trunk on that frame which has been made busy. The switch 203 also transfers the circuit for operating the F relay 204 from the F lead 202 to the TF lead 234 whereby the marker can route a test call to a particular trunk although it has been made busy. On such a call the marker will connect ground not only to lead 202 but to lead 234.

The 10-ohm ground is supplied to each of the sleeve conductors 210 and 211 to hold the hold magnets so that a particular trunk circuit may be marked, even when busy, with a slight positive potential. This potential indication is used on calls such as no test calls.

The release of the switches on the line link and trunk link frames over which the connection has been established is accomplished in the well-known manner and a description thereof herein is deemed to be unnecessary.

What is claimed is:

1. In a telephone system, a calling line, a called line, a trunk circuit, common control means for controlling the establishment of a connection between said lines including said trunk circuit, a source of ringing current, a relay in said trunk circuit controlled from said common control means to connect said source of ringing current with said trunk circuit to signal said called line, means operative upon the response of the called subscriber to cause the release of said relay to disconnect said source of ringing current from said trunk circuit, timing means in said trunk circuit means responsive to the release of said connection at either end of said trunk circuit to initiate the operation of said timing means, a circuit controlled by said timing means for reoperating said relay, and means controlled by said relay upon its reoperation to release the other end of said connection.

2. In a telephone system, a calling line, a called line, a trunk circuit, common control means for controlling the establishment of a connection between said lines including said trunk circuit, a source of ringing current, a ringing control relay in said trunk circuit controlled from said common control means preparatory to connecting said ringing current source with said trunk circuit, a pick-up relay responsive to the operation of said latter relay for completing the connection of said source of ringing current with said trunk circuit, a relay operative upon the response of the called subscriber to cause the release of said ringing control relay to disconnect said source of ringing current from said trunk circuit, timing means in said trunk circuit, means responsive to the release of said connection at either end of said trunk circuit to initiate the operation of said timing means, a circuit controlled by said timing means for reoperating said ringing control relay, means controlled by said latter relay upon its reoperation to release the other end of said connection, and a relay operated following the disassociation of said common control means from said trunk circuit for preventing the reoperation of said pick-up relay upon the reoperation of said ringing control relay.

3. In a telephone system, a calling line, a called line, a trunk circuit, common control means for controlling the establishment of a connection between said lines including said trunk circuit, a plurality of sources of ringing current, a switch for selecting any one of said sources controllable by said common control means, a relay in said trunk circuit controlled from said common control means to connect said selected source of ringing current with said trunk circuit to signal said called subscriber, means operative upon the response of the called subscriber to cause the release of said relay to disconnect said selected source of ringing current from said trunk circuit, timing means in said trunk circuit, means responsive to the release of said connection at either end of said trunk circuit to initiate the operation of said timing means, a circuit controlled by said timing means for reoperating said relay, and means controlled by said relay upon its reoperation to release the other end of said connection.

4. In a telephone system, a calling line, a called line, a trunk circuit, common control means for controlling the establishment of a connection between said lines including said trunk circuit, a cross-bar switch comprising a plurality of cross-point contact sets, a plurality of sources of ringing current associated with said contact sets, means under the control of said common control means to prepare a plurality of said contact sets to select one of said sources of ringing current, a relay in said trunk circuit controlled from said common control means to close said prepared contact sets and to connect said selected ringing current source with said trunk circuit to signal said called line, means operative upon the response of the called subscriber to cause the release of said relay and said switch to disconnect said selected source of ringing current from said trunk circuit, timing means in said trunk circuit, means responsive to the release of said connection at either end of said trunk circuit to initiate the operation of said timing means, a circuit controlled by said timing means for reoperating said relay, and means controlled by said relay upon its reoperation to release the other end of said connection.

LYNN T. ANDERSON.
MYRON C. GODDARD.

REFERENCES CITED

The following references are of record in the file of this patent:

UNITED STATES PATENTS

| Number | Name | Date |
|---|---|---|
| 2,031,692 | Carson | Feb. 25, 1936 |
| 2,065,894 | Hovland | Dec. 29, 1936 |
| 2,430,316 | Voss | Nov. 4, 1947 |

FOREIGN PATENTS

| Number | Country | Date |
|---|---|---|
| 779,939 | France | Jan. 24, 1935 |